Jan. 10, 1961
W. J. WILLIAMS
2,967,916
COMBINATION PASS CARD AND MONITOR SWITCH SYSTEM
Filed June 1, 1959
4 Sheets-Sheet 1
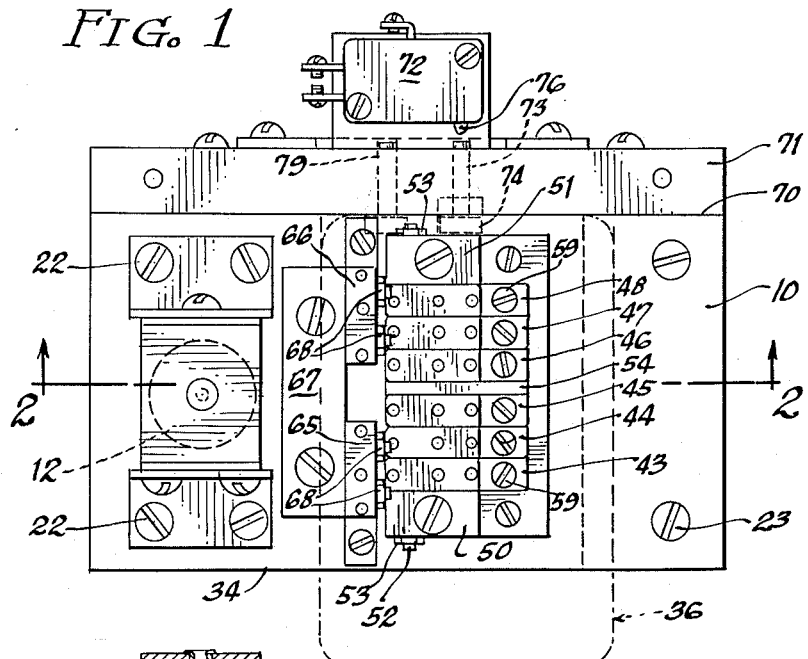
FIG. 1
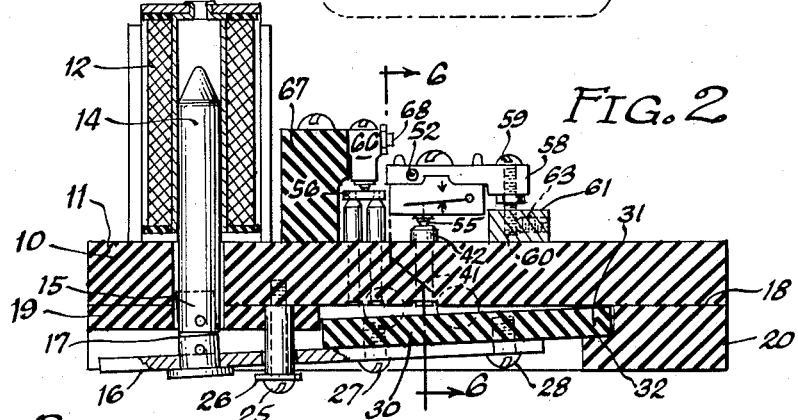
FIG. 2
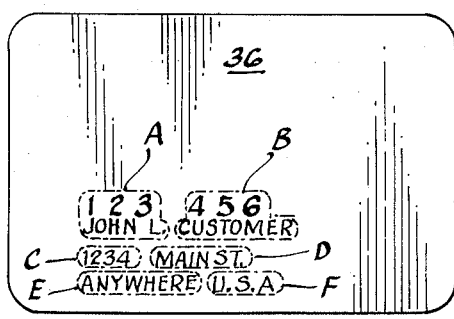
FIG. 3
FIG. 4
INVENTOR.
William J. Williams
BY
Robert L. Kahn
Attorney Jan. 10, 1961 W. J. WILLIAMS 2,967,916
COMBINATION PASS CARD AND MONITOR SWITCH SYSTEM
Filed June 1, 1959 4 Sheets-Sheet 2
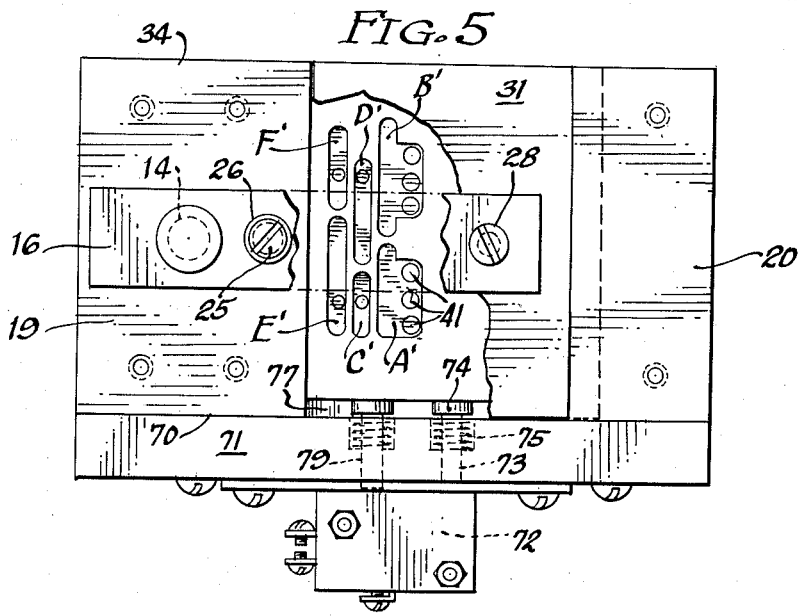
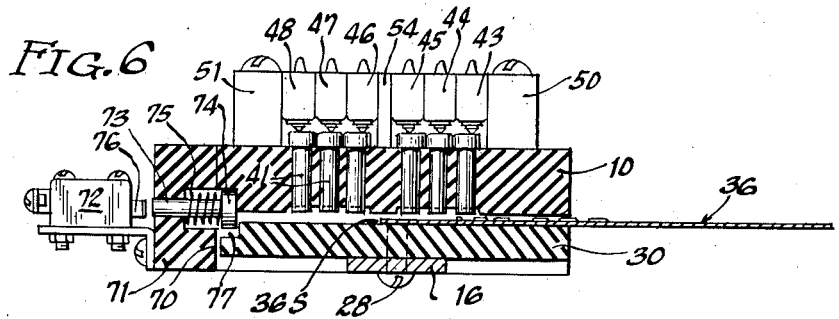
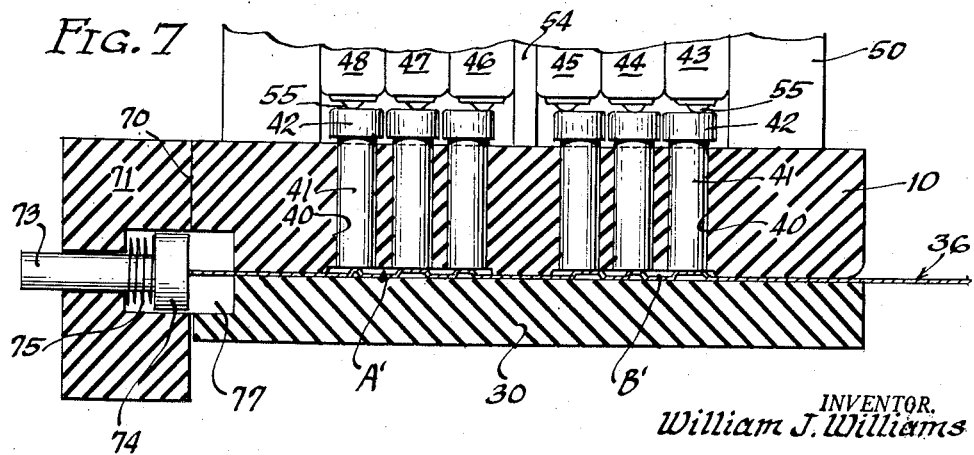
INVENTOR.
William J. Williams
BY
Robert L. Kahn
Attorney Jan. 10, 1961     W. J. WILLIAMS     2,967,916
COMBINATION PASS CARD AND MONITOR SWITCH SYSTEM
Filed June 1, 1959     4 Sheets-Sheet 3

INVENTOR.
William J. Williams
BY
Robert L. Kahn
Attorney

United States Patent Office 2,967,916
Patented Jan. 10, 1961

2,967,916

COMBINATION PASS CARD AND MONITOR SWITCH SYSTEM

William J. Williams, Berwyn, Ill. (Western Industries, Inc., 2742 W. 36th Place, Chicago, Ill.)

Filed June 1, 1959, Ser. No. 817,311

9 Claims. (Cl. 200—5)

This invention relates to a combination pass card and monitor switch system and more particularly to a system which will respond only to cards having embossed code markings.

In certain instances such as for example self-service parking lots, traffic control gates, entrances to buildings, clubs, lockers, etc. it is desirable to provide customers with a simple means for insuring access through a gate, door, or other control means. In the case of a parking lot, for example, gates or barriers may be controlled by some suitable code means in the hands of a customer.

Conventional locks and keys are the most obvious means for controlling access to such restricted regions. However, in the case of a parking lot as an example, due to the great turn-over in customers, it is impractical to use locks and keys. A serious disadvantage of such key control means is the ease with which keys may be duplicated and the difficulty and expense in changing locks.

This invention provides a card and switch system which may be easily changed, automatically or manually, to vary the active code. Thus, in the case of a parking lot, a system embodying the present invention may readily accommodate cards having three or more codes. This may occur when three different codes may be necessary at one time. One code may be current. A second code may be for the past month and a third code may be for the next month. The past month code could run over for say fifteen days in case customers are given a grace period to pay for new cards. The next month code is for people who may have paid in advance for a succeeding month and can be given some advance time during the current month.

The new system can easily be recoded at any desired time and can accommodate as many different codes at any one time as may be necessary. The changing of the code or codes may be effected in a simple manner, either manually or automatically, and provides positive access control with respect to time, without depending upon surrender of a pass card.

An important feature of the present invention resides in the fact that substantial accuracy is incorporated in the entire system with the accuracy in the card part being expensive to reproduce in an unauthorized manner. The system embodying the present invention, while not absolutely fool-proof and not beyond duplication, requires so much expense and effort to duplicate as to make it substantially fool-proof for many purposes.

The invention in general contemplates a prefabricated card of suitable stiff material having accurately controlled dimensions. This card has predetermined areas provided with embossings to predetermined depths. The card cooperates with a card head having suitable matrix means including pins for cooperating with the card and embossing. The head includes an array of electric switches which are controlled by pins and serve to condition electric circuits for monitoring suitable means. The matrix means includes at least one plate having cavities within which the pins are located. By suitable arrangement of switches and circuits it is possible to obtain a large number of different circuits for responding to various code combinations. Thus, a flexible monitor system is provided.

The material of the card is not critical, although if desired the monitor system may have parameters included therein which require cards of certain materials. For many purposes, however, a simple card of plastic or other material which is embossable and generally impervious to water and which is quite stiff will suffice.

The embossing on the card may be accomplished with conventional embossing means provided with a suitable die. In its simplest form, the invention utilizes switch operating pins which are responsive to the presence of an embossed area of carefully controlled extent and location. While it is possible to make the pins responsive to the exact identity of an embossed character, such as letter A for example, in many instances, this is not necessary. Thus, an embossed card embodying the present invention may contain as an example a name and address and a code number. The name and address will be satisfactory so long as characters fall within certain prescribed areas of the card. The code number may generally be satisfactory provided predetermined spaces within predetermined areas have embossing. In all instances, the embossings will have to be accurate in regard to location, overall area taken by embossings and depth or depths. While a uniform embossing depth is the simplest to provide and use, it is possible to have some embossings of one depth and another embossing of a different depth. These differences in depth would be reflected in the code operation of the system and would therefore constitute a code parameter.

In a simple form of the invention, one matrix plate is provided with cavities for registering with embossings extending in one direction from the card. It is possible to have embossings extending upwardly from what might be termed the front of the card and other embossings extending downwardly and provide two separate matrix plates with separate cavities for registering with the embossings on opposite sides of a card.

It is also possible to have some embossings to one depth and other embossings to a different depth or height and have cavities in the matrix plate or plates of corresponding depth. While the simplest embodiments of the invention will have one matrix plate with cavities to accommodate part or all of the card embossings and a flat plate opposed to the cavities on the other side of the card, it is possible to have cooperating male and female die plates for cooperating with an embossed card.

The die plate with cavities will preferably be provided with simple cavities without regard to the characters embossed and rely upon the area and extent of a cavity for registering with an embossing. A cooperating die plate with raised characters, however, if used, will have to accurately conform to the embossed characters. This latter arrangement in general will hardly be worth the extra trouble and expense since the card with forged embossings would be as usable in one form of the invention as in another, assuming of course that the characters embossed were copied in every detail.

In order that the invention may be understood, reference will now be made to the drawings wherein:

Figure 1 is a top plan view of a head with a card shown in dotted outline, the head and card together embodying one form of the present invention.

Figure 2 is a section along line 2—2 of Figure 1.

Figures 3 and 4 are respectively front and edge views of a pass card with embossings thereon.

Figure 5 is a bottom view of the head illustrated in Figures 1 and 2, Figure 5, however, showing a portion of the bottom plate broken away to illustrate the cavities in the matrix plate.

Figure 6 is a section of the head and card on line 6—6 of Figure 2, the latter in the process of being inserted, this view illustrating the feeler pins in the matrix cavities.

Figure 7 is a view similar to Figure 6, but on an enlarged scale with the card in the fully inserted position and the bottom plate pressing the card up against the feeler pins.

Figure 8:
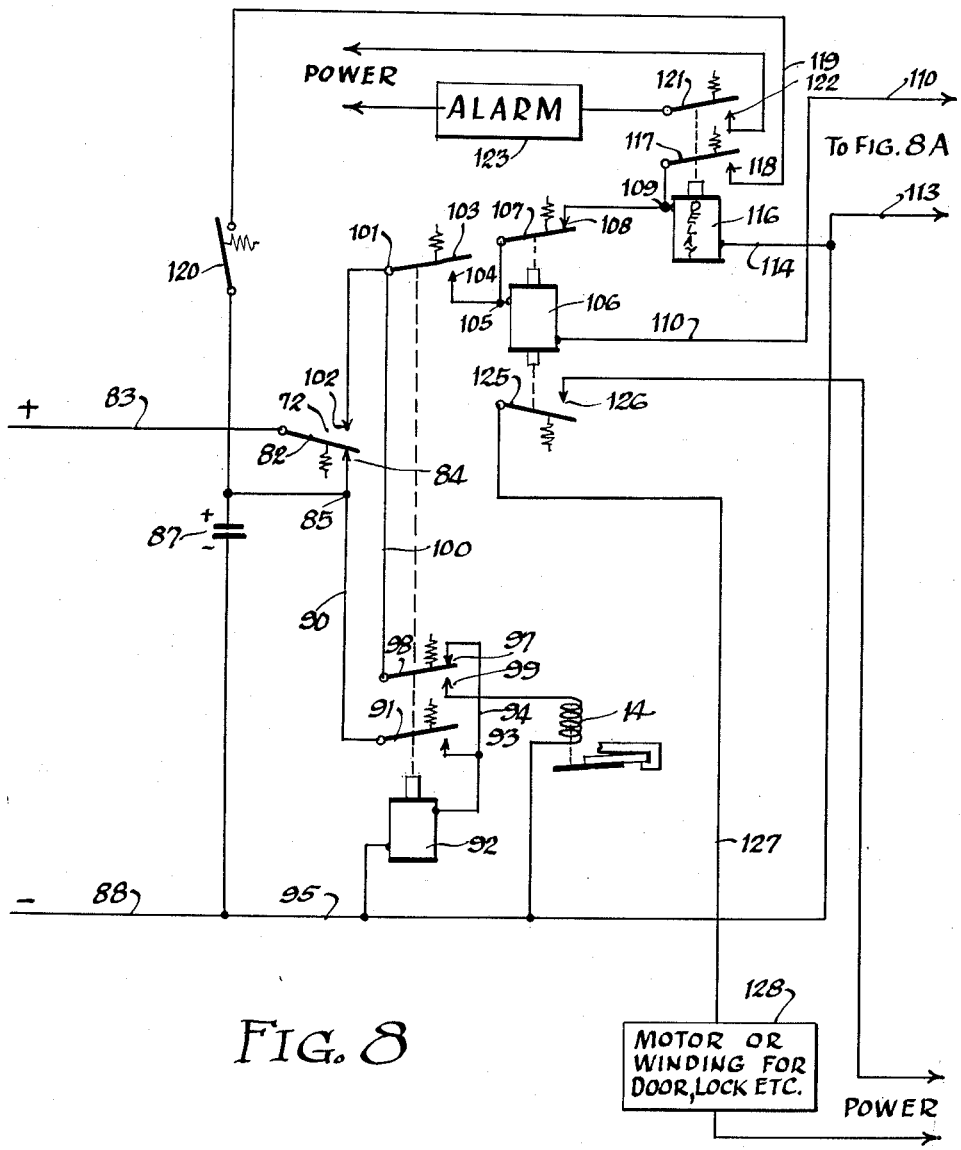
Figure 8A:
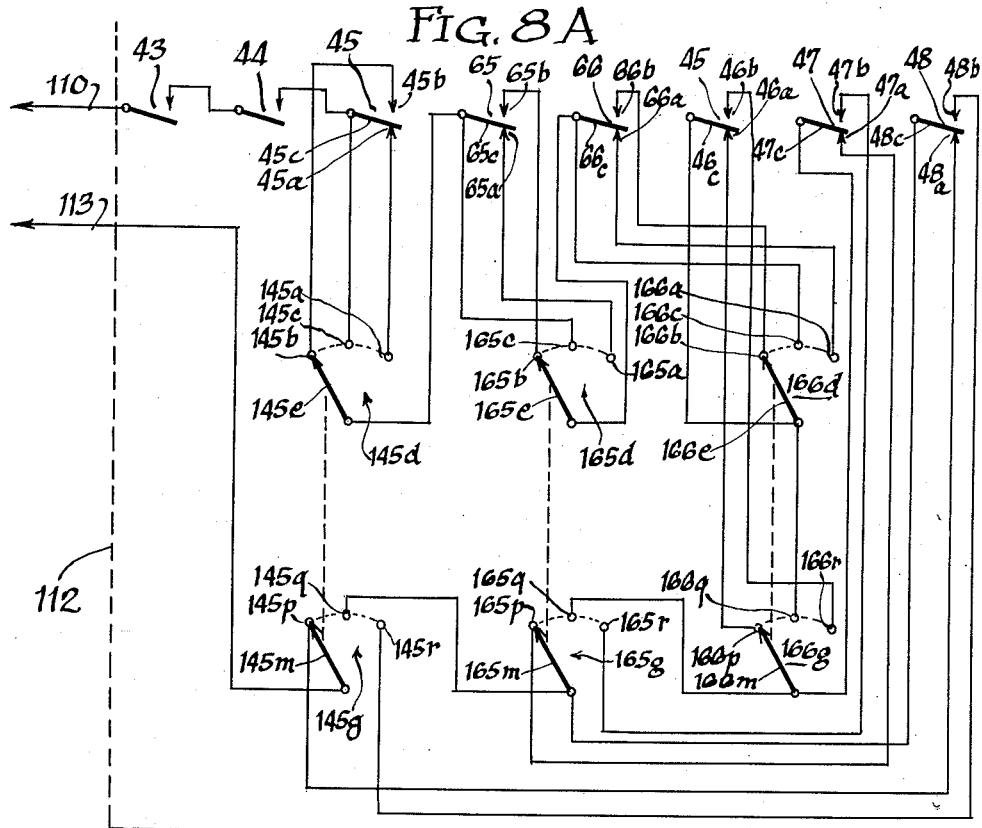

Figures 8 and 8A together show a circuit diagram of the electrical part of a monitor switch system, including an alarm for operation when a defective card is used.

Figure 9:
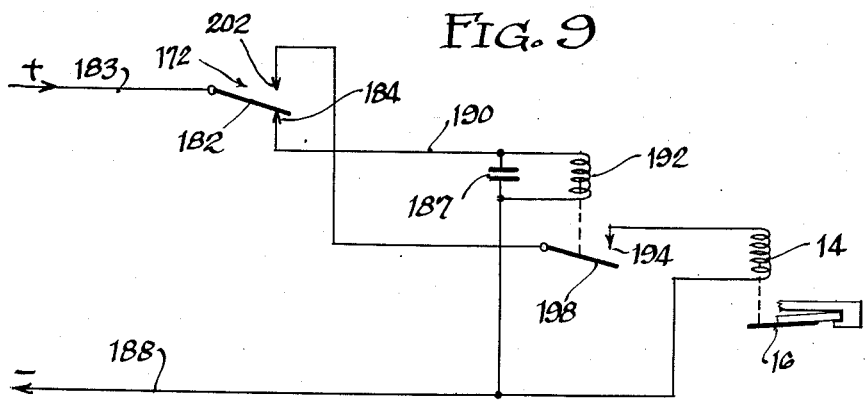

Figure 9 is a modified simplified circuit diagram of the electrically operating portion of the card head mechanism apart from the monitor switching.

A head for use with a card includes base or matrix plate 10 of suitably rigid material. While the base plate may be of any material, it is preferred to make the same of plastic or Bakelite in order to simplify electrical insulation problems. Base plate 10 has top face 11 upon which is disposed solenoid winding 12. Solenoid winding 12 is disposed so that its axis is vertical and slidably disposed therein is armature plunger 14. Plunger 14 has bottom portion 15 coupled to operating bar 16 through pivoted link 17. Link 17 permits plunger 14 to slide smoothly within winding 12 without jamming while permitting operating bar 16 to move generally along the arc of a circle.

Base plate 10 has bottom face 18. Bottom face 18 is flat and has blocks 19 and 20 attached to the bottom face at the two end portions to provide the irregular bottom surface of the head. Blocks 19 and 20 may also be of rigid plastic material. Blocks 19 and 20 are conveniently attached to base plate 10 by means of bolts 22 and 23. Other means of attachment are also possible.

Operating bar 16 has its downward travel as seen in Figure 2 limited by bolt 25 carrying washer 26. Bolt 25 extends through a suitable aperture in operating bar 16 and extends through block 19 into a tapped recess in base block 10. While operating bar 16 is illustrated as being of metal, such as steel, the nature of the material is unimportant so long as the bar has sufficient mechanical strength.

Operating bar 16 has rigidly attached thereto as by bolts 27 and 28 movable plate 30. Plate 30 is of hard material and may also be of plastic such as Bakelite. Plate 30 has one edge portion 31 disposed in cut-out 32 in block 20. Cut-out 32 should be deep enough (along the thickness of plate 30) so that plate 30 can be rocked by the armature plunger to an upward position against the bottom face 18 of base plate 10, as illustrated for example in Figure 7. Plate 30 fits in between blocks 19 and 20. It will be convenient to refer to the various sides of the head and assuming that a pass card is inserted from the front of the head, side 34 as seen in Figure 1 will be considered as a front and the remaining sides will be designated with relation thereto.

Cooperating with the head is a pass card generally indicated by 36 and illustrated in Figures 3 and 4. Pass card 36 may be of celluloid or some other stiff material which may be embossed with heat or pressure, or both. Pass card 36 has a predetermined thickness and is provided with embossings as illustrated in Figures 3 and 4. As illustrated here, the embossings are all in the same direction, upwardly from the top face of the card.

As seen in Figure 3, the embossings in this particular instance have areas A and B which contain some numbers and a name. The embossing area which is effective is outlined in dotted lines in Figure 3. Each embossing area A and B has two lines of characters. As will be apparent later, considerable latitude in regard to the presence or absence of numbers and letters is permissible within the respective embossing areas.

In addition to areas A and B, areas C, D, E, and F are also provided. These areas may be for street number, street, city, and country or state. It is understood that the number, location, size and designation of the areas is exemplary and may be varied to suit requirements.

As illustrated in Figure 4, the embossing is substantially uniform insofar as regards depth or height. However, it is possible to have the embossing in area A or B or both, for example, to a greater height or depth than the remaining embossing. For convenience the forward edge of the card will be designated as 36S.

It will be understood that card 36 is to be inserted between plate 30 and the bottom face of base 10. It is therefore important that block 30 have sufficient clearance at the hinge end at cut-out 32 to accommodate the card during the insertion. Cooperating with embossed areas A to F inclusive in card 36 are cavities A' to F' inclusive in base 10. These cavities have the outline as shown in Figure 5 and correspond accurately with the outlines of areas A to F inclusive in Figure 3 of the card. The depths of cavities A' to F' inclusive in base plate 10 accurately conform to the height or depth of the embossings in card 36.

Base plate 10 has passages extending from the top surfaces of the cavities as seen in Figures 6 and 7 (these are the bottoms of the cavities as seen in Figure 5) through the base plate up to top face 11 of the base plate. Since the passages through base plate 10 are all similar, except for location, only representative ones will be described. Referring to Figures 6 and 7, passages 40 accommodate pins 41. Pins 41 have enlarged heads 42 which can rest upon top face 11 of plate 10. Pins 40 may be of any suitable material such as metal or plastic. Each pin 40 has the pin body equal in length to the thickness of plate 10.

When any pin 40 is in its down position, as illustrated in Figure 6, enlarged head 41 will permit the pin to drop so that the free end of the pin is substantially flush with bottom face 18 of base plate 10. This will prevent the edge of a code card from locking against the side of a pin and jamming. As is clear from Figure 7, the embossing on a code card will function to elevate a pin so that the free end of a pin is flush with the cavity surface. Head 41 of a pin will also be elevated. The elevation of a pin is utilized to control an electric switch.

The electric switches controlled by the various pins are of a type readily available on the market. As an example, one type is available under the trade name "Micro-Switch." These various switches utilize small snap-action type switches and can operate with movement of a finger part as small as about .020". Such switches are available in single pole single throw or double throw and will break a 110 volt circuit providing the wattage is about 100 watts or less. Such switches are widely used in various devices and usually come in a molded plastic housing with terminals for connection to the contact points and have a tiny actuating finger projecting through a wall of the housing. Since these switches are well known, a detailed description is believed to be unnecessary.

Referring now to Figure 1, a battery of tiny switches, here illustrated as six in number, and designated as 43 to 48 inclusive, is shown. Because of differences among switches and because of various tolerances, it is desirable to provide switch mounting which permit individual adjustments. Switches 43 to 48 inclusive are disposed between end blocks 50 and 51 bolted to base plate 10. Pivot pin 52 is mounted in blocks 50 and 51 and is above but parallel to top face 11 of base plate 10. Pivot pin 52 passes through suitable passages in the housings of switches 43 to 48 inclusive. Pivot pin 52 has its ends threaded and provided with nuts 53 for maintaining the pin in position. Due to spacing between adjacent cavities, spacer block 54 is provided between switches 45 and 46.

As shown in Figure 2, each switch has its actuating finger 55 disposed to extend downwardly toward base plate 10. A switch actuating finger may cooperate directly with an embossing feeler pin 41, or as shown in Figure 2, two feeler pins may have a small block 56 for engaging one switch finger. It is desirable to provide individual adjustments for each switch 43 to 48 inclusive. Accordingly each switch housing has extension 58 laterally of pivot pin 52. Extension 58 has an aperture extending vertically (as seen in Figure 2) into which is disposed bolt 59. Bolt 59 extends into recess 60 in block 61 secured to top face 11 of plate 10. Set screw 63 is in a tapped recess transversely of recess 60. Nut 64 can be used to adjust the elevation of extension 58 and set screw 63 will lock bolt 59 in position.

Each of switches 43 to 48 inclusive is provided with individual adjustments so that each switch may be nicely adjusted to be in normal position when an embossing feeler pin is down (Figure 6) and will be operated when the feeler pin is elevated. As a rule, each switch is biased so that the cooperating feeler pin will be in down position irrespective of the position of base plate 10. Thus even if base plate 10 is turned upside down, the pin arrangement will work. Hence the use of "elevating" and similar words for the movement of the feeler pins does not imply that the mechanism will only operate in one position.

In addition to switches 43 to 48 inclusive, additional switches 65 and 66 are required. These switches are mounted upon block 67 rigidly attached to base plate 10. Switches 65 and 67 are attached to block 67 by spaced bolts 68 passing through the housing of each switch. By having generous clearances between the housing of each switch 65 and 66 and the supporting bolts, it is possible to provide suitable adjustment of each switch housing so that the fingers of switches 65 and 66 will be in proper adjustment with respect to the feeler fingers in base plate 10.

It is understood that various means for obtaining the adjustments of the individual switches with respect to the feeler pins may be obtained so that each operating finger of a switch is in contact with one or more feeler fingers and can be operated by a small movement of the particular feeler finger or fingers involved.

For proper operation it is necessary that bottom plate 30 be moved to force a code card up against base plate 10 so that the embossings on the card can cooperate with the feeler pins. Means are provided for accomplishing this when the code card is in proper position in the monitor head. To rear edge 70 of base plate 10 is bolted block 71 carrying switch 72 in a suitable housing. Switch 72 may be of the same general type as 43 to 48 inclusive except that it can be larger. Switch 72 is operated by plunger 73 having enlarged head 74. Plunger 73 is biased to a normal outward position (away from switch 72) by coil spring 75.

Plunger 73 in this particular instance is physically separate from the switch and is slidably disposed to cooperate with operating finger 76 of switch 72. It is clear therefore that plunger 73 cooperates with a switch in much the same fashion that the feeler pins 41 cooperate with their respective switches 43 to 48, inclusive. Head 74 of plunger 73 operates within cutout region 77 provided in bottom plate 30 and base plate 10.

Head 74 of plunger 73 is disposed directly in the path of front edge 36S of card 34 as it is inserted in the monitor head. Dummy plunger 79, generally similar to plunger 73, is provided in this instance to prevent cocking of the card. Switch 72 is so adjusted that when card 36 is in position within the monitor head and front edge 36S has reached rear block 71, switch 72 will be operated by the plunger engaging the front edge of the card. As will be more fully disclosed, the operation of switch 72 serves to energize solenoid 12 and results in bottom plate 30 being pulled up to force card 36 against bottom face 18 of base plate 10. In Figure 7, the card is shown in the correct operating position for switch 72.

If a more precise action is desired, bottom plate 30 may be secured loosely on posts to permit up and down travel with respect to plate 10. However, the hinge arrangement illustrated in Figure 2 is satisfactory.

Referring now to Figures 8 and 8A, there is shown an electrical system associated with the new apparatus. Switch 72 has movable contact 82 which is connected by wire 83 to one terminal of a suitable source of direct current.

Movable contact 82 is normally positioned against switch contact 84 connected to junction point 85. Junction point 85 is connected to one terminal of condenser 87, the other terminal of which is connected by wire 88 to the other terminal of a source of direct current. Condenser 87 is preferably of an electrolytic type having substantial capacitance and may, for example, have a capacitance of one-half or more microfarads. Ordinarily condenser 87 can be charged quickly, say in ¼ to ½ second for example.

Referring back to junction point 85, this is connected by wire 90 to movable contact 91 of relay 92. Movable contact 91 cooperates with off-normal stationary contact 93 connected to wire 94 going to one terminal of the winding of relay 92. The other terminal of the winding of relay 92 is connected to wire 95 going to wire 88. Wire 94 is connected to normal contact 97 of relay 92 cooperating with movable contact 98. Movable contact 98 also cooperates with off-normal stationary contact 99 connected to one terminal of the winding of solenoid 14, the other terminal of this solenoid winding being connected to wire 95.

Movable contact 98 of relay 92 is connected by wire 100 to junction point 101. Junction point 101 is connected on the one hand to stationary contact 102 of switch 72 and is also connected to movable contact 103 of relay 92. Movable contact 103 cooperates with off-normal stationary contact 104 going to junction point 105. Junction point 105 has one wire going to the winding of relay 106 and has another wire going to movable contact 107 of this same relay. Movable contact 107 of relay 106 cooperates with normal stationary contact 108 connected to junction point 109.

Referring back to the winding of relay 106, the other terminal of this winding is connected by wire 110 to a switch labyrinth generally indicated by 112 and which will be described in detail later. Switch labyrinth 112 has its other terminal 113 connected to wire 95. Terminal 113 is also connected by wire 114 to one terminal of the winding of delay relay 116 whose other terminal is connected to junction point 109. Delay relay 116 is slow to close and has junction point 109 connected to movable contact 117 of this relay. Movable contact 117 cooperates with off-normal stationary contact 118 connected by wire 119 and manual switch 120 back to junction point 85. Relay 116 also has movable contact 121 cooperating with off-normal contact 122. Movable contact 121 is connected through alarm 123 to one terminal of a power source while stationary contact 122 is connected to the other terminal of a power source. Such a power source may be the winding of a transformer suitably energized from a power line. Alarm 123 may be a gong, or a light, or a combination of the two or may serve to accommodate a remote indication to call police or the like.

Referring back to relay 106, this has an additional movable contact 125 cooperating with off-normal stationary contact 126. Movable contact 125 is connected by wire 127 to one terminal of a motor or winding or other suitable means for unlocking or opening or locking or closing a door, barrier, or the like. This means, generally indicated by 128, has its terminal connected to one side of a power line. Relay contact 126 is connected to the other side of a power line.

The operation of the electrical part of the system will first be described. Assuming that a card has been inserted in the monitor head and has reached the plunger for operating switch 72, movable contact 82 will be moved up to close against switch contact 102. This will close a circuit through junction point 101 and wire 100, relay contacts 98 and 97 through the winding of relay 92 to wire 88. Relay 92 will close. The closing of relay 92 will establish a relay holding circuit between contacts 91 and 93. This relay holding circuit will include charged condenser 87 which will now discharge through the winding of relay 92. By suitable control of inductance or resistance of the circuit, condenser 87 can be made to discharge through relay winding 92 for a period of about ¼ of a second, as an example, just long enough for the system to operate. When condenser 87 discharges, relay 92 is deenergized. This permits the card to be withdrawn since the solenoid will be deenergized.

Upon operation of relay 92, contacts 98 and 99 close and solenoid 14 becomes energized. This causes the card to be pushed up against the bottom of base plate 10. Assuming that the card is positioned properly and has the correct embossing areas, depth and the like, the various feeler pins in the cavities will be operated. These pins will operate the respective switches controlled by them, which switches are in circuits constituting a switch labyrinth indicated by 112. If everything is in proper shape, a through circuit is established by switch labyrinth 112. With this condition, an energizing circuit for relay 106 will be established. This circuit goes from wire 83 through switch contacts 82 and 102 to junction point 101. From junction point 101 the circuit continues through relay contacts 103 and 104 to junction point 105. From junction point 105, the circuit continues through the winding of relay 106, wire 110 through switch labyrinth 112 to junction 113 and thence through wire 95 to wire 88. Relay 106 will be energized and pull down movable contact 107. At the same time, relay 106 will cause its movable contact 125 to close against off-normal contact 126. A circuit will thus be established for monitor winding 128 and this will result in the lock or traffic gate or door or whatever is being controlled being operated as a result of the insertion of the card.

Assume that the card is a forgery or is out-dated and that the embossings, if any, do not actuate the required feeler pins in the cavities of base plate 10. In that case, switch labyrinth 112 will not complete a circuit and relay 106 will not be energized. Hence, part 128 which is the motor or actuating winding will not be energized and the card will not function as intended. The failure of the card to function can result in an alarm being sounded. Referring to junction point 105, an energizing circuit from wire 83 will go through contacts 107 and 108 of relay 106 (which fails to be energized) through to junction point 109. From junction point 109 an energizing circuit for the winding of relay 116 will be established through wire 114 to junction point 113 and thence by wire 95 to wire 88.

Relay 116 is of the delay type which closes slowly relative to relay 106. It is immaterial whether the delay is established by electrical means such as a short circuiting ring or by mechanical means such as a dash pot. In any event, relay 116 should have a sufficiently long delay so that it will not close until relay 106 definitely fails to open. In practice, the time allowed for the pins to be moved by the embossings plus the response of relay 106 may be of the order of a tenth of a second, as an example. Assuming that relay 116 is thus delayed for, say, about ½ or ⅕ of a second, contacts 117 and 118 will close and establish a circuit through wire 119 and switch 120 to junction point 85. At the same time, delay relay 116 will close contacts 121 and 122 to sound an alarm.

It will be noted that relay 116 will remain energized irrespective of the position of movable contact 82 of switch 72. Thus, while the card is inserted so that movable contact 82 is against contact 102, a direct circuit from wire 83 to wire 88 will be established. If the card head releases and the card is pulled out, then movable contact 82 will close against contact 84 and will still keep relay 116 energized. The delay action on relay 116 will prevent this relay from falling out if switch 72 goes from one position to another. If a continuous alarm is not desired, switch 120 may be opened whereupon the alarm will only be sounded while the card is in the monitor head. It is possible for relay 116 to have normally open contacts connected to wire 83 and contact 99 of relay 92 for the purpose of locking the head on the false card and preventing its withdrawal.

If desired, the alarm portion of the system may be eliminated, in which case relay contacts 107 and 108 and wire 114 with relay 116 and its contacts may be omitted completely.

Referring now to switch labyrinth 112, an exemplary system is shown. It is understood that the circuit details can be varied depending upon how many switches are to be operated by feeler fingers. In this particular system, eight switches numbered to correspond with the switches previously described are provided. The order in which the switches appear in the circuit is important only to the extent that certain embossings in certain areas may be changed at various times. Thus, for example, areas A and B may be changed frequently with the remainder of the embossing being constant over, say, a period of a year. Hence, the switches controlled by the embossings in areas A and B will preferably be in those portions of the circuit which may be changed by manual or other switching means.

Line 110 going to switch labyrinth 112 can therefore be connected as illustrated to the movable contact of switch 43. The stationary contact of this switch is connected to the movable contact of switch 44. The stationary contact of switch 44 is connected to the movable contact of switch 45. Switch 45 is a single pole double throw switch having normal contact 45a and off-normal contact 45b. The three contacts of switch 45 are connected by wires to a series of three contacts 145a to 145c inclusive, the contacts bearing the corresponding letters being connected together. The 145 series of contacts is part of a switch 145d having movable contact 145e. Switch 145d may be manually controlled or may be controlled by suitable automatic means. Switch 145d has its movable contact 145e connected to movable contact 145m of switch 145g. Switch 145g has contacts 145p to 145r inclusive. Movable contact 145m of this switch is connected to wire 113.

Going back to switch 145d, movable contact 145e is connected to movable contact 65c of switch 65. Switch 65 has normal and off-normal contacts 65a and 65b, respectively, cooperating with movable contact 65c. Switch 65 has its various contacts connected to switch 165d, the pattern of connections being the same as with the 45 and 145d switches. Switch 165d is also associated with corresponding switch 165g in essentially the same manner as switches 145d and 145g. Thus, movable contact 165m is mechanically tied to movable contact 165e. Contact 145q is connected to movable contact 165m.

Referring now to switch 66, movable contact 66c is connected to movable contact 165e of switch 165d and is also connected to contact 166c of switch 166d. Normal contact 66a is connected to switch contact 166a while off-normal contact 66b is connected to contact 166b. Movable contact 166e of switch 166d is mechanically tied to movable contact 166m of switch 166g. Switch 166g has contacts p, q and r connected as shown. Thus, contact 166q is connected to movable contact 166e which in turn is connected to movable contact 46c of switch 46. Contact 166p is connected to normal contact 46a of switch 46 while contact 166r is connected to off-normal contact 46b. Movable contact 166m is connected back to contact 165q. Contacts 165p and 165r are connected respectively to contacts 47a and 47b of switch 47. Movable contact 47c of switch 47 is connected to movable contact 166m.

Switch 48 has its movable contact 48c connected to movable contact 165m. Movable contacts 48a and 48b are connected respectively to contacts 145p and 145r.

Each of the manual or card control switches in the 145, 165 and 166 series of switches may be turned to any of three positions, it being understood that the switches operate in pairs due to the coupling between the movable contacts as previously indicated. By following through various switch positions, it will be noted that some one or more of switches 45, 46, 65 and 66 may be shorted out or not as desired. The switch labyrinth when properly operated must provide a through metallic circuit from wire 110 to wire 113. By controlling the switches, various code combinations reflected in various operating switches will be effective to establish the required operation condition for the labyrinth.

Referring to Figure 9, there is shown a simplified wiring system wherein the alarm feature is omited and wherein the switch labyrinth has been electrically separated from the card griping control circuit. Referring to Figure 9, wires 183 and 188 correspond to wires 83 and 88 in Figure 8 and are adapted to be connected to a source of direct current. Wire 183 is connected to movable contact 182 of switch 172 which corresponds to switch 72. Movable contact 182 cooperates with normal contact 184 which is connected by wire 190 to one terminal of the operating winding of relay 192. Relay 192 has its lower terminal connected to wire 188. Connected across the winding of relay 192 is capacitor 187. Relay 192 has movable contact 198 which is connected back to off-normal contact 202 of switch 172. Movable contact 198 cooperates with off-normal contact 199 which is connected to one terminal of the winding of solenoid 14. The lower terminal of the winding of solenoid 14 is connected to wire 188.

In the system illustrated in Figure 9, relay 192 is normally energized so that movable contact 198 is closed against fixed contact 199. However, solenoid 14 is not energized so long as switch 172 is in the position shown. When a card is inserted in the monitor head and actuates switch 172, movable contact 182 closes against fixed contact 202. Condenser 187 prevents relay 192 from opening for a short period of time and during this short period of time, the winding of solenoid 14 is energized to push the pass card up against the plate containing the feeler pins. In the system illustrated in Figure 9, switch labyrinth 112 will have wires 110 and 113 connected through a load such as load 128 in Figure 8 to a source of direct current. In such case, if the card operates the proper switches in the switch labyrinth, a circuit through 112 will be established and cause a load such as a lock, door, gate or other device to be actuated.

What is claimed is:

1. For use with a stiff card provided with embossings in selected areas and to predetermined depths, said card having one face above which all said embossings project, the other card face being free of any projections, a monitor head for receiving said card and cooperating therewith, said monitor head including a pair of rigid plates, one plate having a smooth face for cooperating with the other face of said card, the other plate being a matrix plate, means for normally disposing said two plates in face to face relation but spaced sufficiently to permit ready insertion of said embossed cards between said plates, said matrix plate having at least one cavity complementarily arranged to accommodate the card embossing when the two plates are moved toward each other to grip the card, means for moving said plates toward each other after a card is in proper position so that the card is tightly gripped therebtween, said matrix plate having a plurality of passages extending from the roof of a cavity through the matrix plate to the face of said matrix plate remote from said card, said passages being so located as to correspond with coded locations of card embossings, a feeler pin disposed in each passage and longitudinally movable therein, each feeler pin having a normal position where an end portion thereof extends from the cavity roof into the cavity region in the absence of a card embossing, at least one electric switch carried by said matrix plate on said remote face, means for physically coupling said pins to said electric switch, said electric switch including means for biasing said switch to a normal position from which position said switch is operable to an off-normal position by movement of cooperating feeler pins into the matrix plate, the embossing on said stiff card having sufficient rigidity to operate pins and biased switches to obtain positive switch action with relatively small movement of active feeler pins, said construction being characterized by mechanical accuracy in the monitor head and requiring stiff cards with accurate embossing whereby reproduction of counterfeit cards to the required accuracy for operating a monitor head is rendered difficult.

2. The combination according to claim 1 wherein said electric switch is a self-contained physically separate construction from said matrix plate, means for mounting said electric switch at two spaced regions on said matrix plate, said mounting means including means for adjusting the relative position of switch and matrix plate whereby a commercially available switch may be readily adapted to the operation of the monitor head.

3. The combination according to claim 1 wherein a plurality of electric switches are provided, each switch being physically separate from the matrix plate and from other switches, means for mounting said switches in side by side relation, said mounting including a pivot rod for securing such switches at one region of each switch and screw adjusting means for securing each switch at another region, said screw adjusting means permitting independent adjustment of each switch with respect to its cooperating feeler pin whereby each switch may be adjusted for satisfactory operation from a predetermined card embossing.

4. The construction according to claim 1 wherein said electric switch is a self-contained structure of the snap action type and including as a part thereof a switch pin movable longitudinally for switch operation, said switch and its pin being biased to a normal position from which position said switch pin is movable to snap said switch from a normal to an off-normal position, means for adjustably mounting said switch upon said matrix plate so that the normal position of the switch pin can be communicated to a cooperating feeler pin for biasing said feeler pin to its normal position, said feeler pin, when moved by a card embossing, operating said switch member to an off-normal position.

5. For use with a stiff card provided with embossings in selected areas and to predetermined depths, said card having one face above which all said embossings project, the other card face being free of any projections, a monitor head for receiving said card and cooperating therewith, said monitor head including a pair of rigid plates, one plate having a smooth face for cooperating with the other face of said card, the other plate being a matrix plate, means for normally disposing said two plates in face to face relation but spaced sufficiently to permit ready insertion of said embossed cards between said plates, said matrix plate having at least one cavity complementarily arranged to accommodate the card embossings when the two plates are moved toward each other to grip the card, means for moving said plates toward each other after a card is in proper position so that the card is tightly gripped therebetween, said matrix plate having a plurality of passages extending from the roof of a cavity through the matrix plate to the face of said matrix plate remote from said card, said passages being so located as to correspond with coded locations of card embossments, a feeler pin disposed in each passage and longitudinally movable therein, each feeler pin having a normal position where an end portion thereof extends from the cavity roof into the cavity region in the absence of a card embossing, each pin having an enlarged head at the end remote from the cavity, at least one electric switch carried by said matrix plate on said remote face, said switch including a switch operating pin movable longitudinally, means for mounting said switch so that at least one enlarged pin head cooperates with said switch pin, said electric switch including means for biasing said switch to a normal position from which position said switch is operable to an off-normal position by movement of cooperating feeler pins into the matrix plate, the embossing on said stiff card having sufficient rigidity to operate pins and bias switches to obtain positive switch action with relatively small movement of active feeler pins, said construction being characterized by mechanical accuracy in the monitor head and requiring stiff cards with accurate embossing whereby reproduction of counterfeit cards to the required accuracy for operating a monitor head is rendered difficult.

6. The construction according to claim 5 wherein a plurality of electric switches are provided, each switch being physically separate from the matrix plate and from other switches, means for mounting said switches in side by side relation, said mounting including a pivot rod for securing such switches at one region of each switch and screw adjusting means for securing each switch at another region, said screw adjusting means permitting independent adjustment of each switch with respect to its cooperating feeler pin, said switches being so disposed that the feeler pins and switch operating pins are generally alined.

7. For use with a stiff card provided with embossings in selected areas and to predetermined depths, said card having one face above which all said embossings project, the other face being free of any projections, a monitor head for receiving said card and cooperating therewith, said monitor head including a pair of rigid plates, one plate having a smooth face for cooperating with the other face of said card, the other plate being a matrix plate, means for normally disposing said two plates in face to face relation but spaced sufficiently to permit ready insertion of said embossed cards between said plates, said matrix plate having at least one cavity complementarily arranged to accommodate the card embossings when the two plates are moved toward each other to grip the card, means actuated by an edge of said card for moving said plates toward each other after a card is in proper position so that the card is tightly gripped therebetween, said matrix plate having a plurality of passages extending from the roof of a cavity through the matrix plate to the face of said matrix plate remote from said card, said passages being so located as to correspond with coded locations of card embossings, a feeler pin disposed in each passage and longitudinally movable therein, each feeler pin having a normal position where an end portion thereof extends from the cavity roof into the cavity region in the absence of a card embossing, a plurality of electric switches carried by said matrix plate on said remote face, means for coupling said pins to said electric switches, said electric switches including means for biasing said switches to a normal position from which position each switch is operable to an off-normal position by movement of cooperating feeler pins into the matrix plate, separate means for adjusting each switch for proper cooperation with feeler pins, the embossing on said stiff card having sufficient rigidity to operate pins and biased switches to obtain positive switch action with relatively small movement of active feeler pins, said card having sufficient stiffness so that a card edge can readily actuate the plate moving means, said construction being characterized by mechanical accuracy in the monitor head and requiring stiff cards with accurate embossing whereby reproduction of counterfeit cards to the required accuracy for operating a monitor head is rendered difficult.

8. The construction according to claim 7 wherein said flat rigid plates have sufficient clearance between them to permit the ready insertion of an embossed pass card, a solenoid carried by one of said two plates, said solenoid having an armature attached to the remaining plate, said armature and solenoid cooperating to move said two plates together to grip a card when positioned between said plates upon solenoid energization, an additional switch for controlling said solenoid energization and an operating member for said switch disposed to be engaged by the edge of a pass card when positioned between said plates.

9. For use in a pass card detecting system, a monitor head comprising a flat rigid matrix plate having one face thereof provided with at least one cavity whose size is complementary to a stiff pass card having embossing on one face thereof, a solenoid carried by said plate on the other face thereof, said solenoid including a winding whose axis is perpendicular to said plate, an armature passing through said plate and into said solenoid winding, said armature being movable longitudinally of said winding, an auxiliary rigid plate coupled to said armature, said auxiliary plate having its smooth face opposite the cavity and spaced therefrom sufficiently to permit insertion of an embossed card of stiff material between said two plates, means for mounting said auxiliary plate so that it can be moved toward the cavity upon solenoid energization, said matrix plate having a plurality of passages extending from the roof of the cavity to the other face thereof, said passages being located to correspond to predetermined coded embossings, a feeler pin for each passage, each pin having an enlarged head normally resting upon the other face of said matrix plate, said pin in such position having an end portion projecting into the cavity region but short of the plane defined by the cavity containing face of the plate, a plurality of electric switches, each switch being a complete device having its own housing and having bias means and including a switch operating pin biased to a normal position and movable longitudinally for a switch operation, adjustable means for mounting each switch so that a switch operating pin can be operated by at least one feeler pin and switch means connected in the solenoid winding circuit carried by said monitor head for cooperation with the forward edge of a card for closing the solenoid circuit when said card is in proper position with respect to the cavity.

References Cited in the file of this patent
UNITED STATES PATENTS

| | | |
|---|---|---|
| 2,057,532 | MacDonald | Oct. 13, 1936 |
| 2,166,194 | Roman | July 18, 1939 |
| 2,473,664 | Taylor | June 21, 1949 |
| 2,714,201 | Whitehead | July 26, 1955 |